(No Model.)
P. A. SCHUMACHER.
END BEARING FOR SHAFTS.
No. 591,502. Patented Oct. 12, 1897.
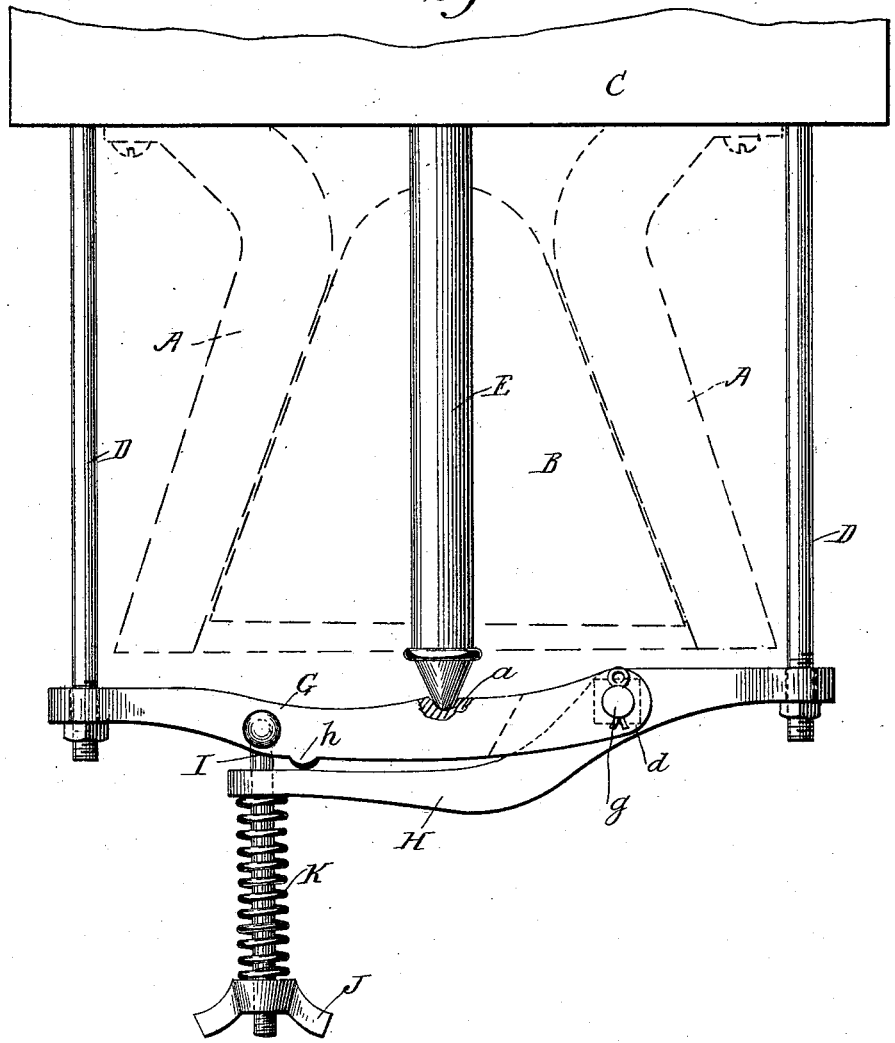
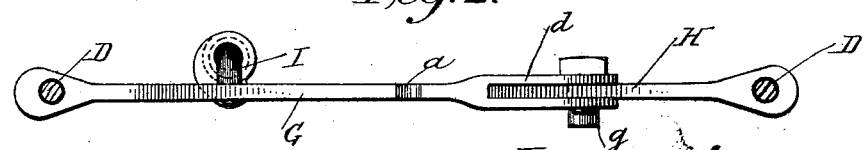
Witnesses.
Louis Meyer
Charles Simmonds
Inventor.
P. A. Schumacher

UNITED STATES PATENT OFFICE.

PETER A. SCHUMACHER, OF REYNOLDS, NORTH DAKOTA.

END BEARING FOR SHAFTS.

SPECIFICATION forming part of Letters Patent No. 591,502, dated October 12, 1897.

Application filed May 27, 1896. Serial No. 593,356. (No model.)

*To all whom it may concern:*

Be it known that I, PETER A. SCHUMACHER, of Reynolds, in the county of Grand Forks and State of North Dakota, have made certain new and useful Improvements in End Bearings for Shafts, of which the following is a specification.

This invention relates to bearings for supporting the driving-shafts of feed-grinding mills or other similar mills; and it consists in the novel construction and combination of the parts hereinafter fully described and claimed.

In the drawings, Figure 1 is a side view of a shaft and its end bearing, showing portions of a grinding-mill. Fig. 2 is a plan view of the bearing for the shaft.

A is the stationary bur of a grinding-mill, and B is the revoluble bur, secured on a driving-shaft E. The burs are shown in dotted lines.

C is a portion of the frame of the mill provided with two rods D, which depend below the end of the shaft E.

G is a lever pivotally supported by one rod D at one end and provided with a forked portion *d* at its other end. A recess *a* is provided in the lever G for the end of the shaft E to run in.

H is a lever pivotally supported at one end by the other rod D and pivoted in the forked end *d* of the lever G on the pin *g*. The free end of the lever H extends under the lever G and bears against a stop *h* on its under side.

I is a rod pivoted to the lever G and passing through a hole in the lever H.

J is an adjusting-nut screwed on the lower end of the rod I, and K is a spring encircling the rod I and arranged between the said nut and the lever H. The spring K presses the lever H against the stop *h*, so that the burs of the mill cannot rub against each other. When a hard substance, such as a stone, enters between the burs, the shaft E is forced downward, and the levers G and H turn slightly on their pivots and allow the hard substance to pass between the burs and drop out of the mill without injuring the burs.

What I claim is—

1. In a step-bearing for a shaft, the combination, with a lever G pivotally supported at one end and provided with a forked portion at its other end, a recess in its upper side for the end of the shaft to run in, and a stop on its under side; of a lever H pivotally supported at one end and pivoted in the said forked portion and bearing against the said stop; a rod connected to the lever G and passing through a hole in the free end of the lever H, an adjusting-nut on the lower part of the said rod, and a spring arranged between the said nut and the lever G, substantially as set forth.

2. In a step-bearing for a shaft, the combination, with a lever G pivotally supported at one end and extending under and supporting the shaft; of a lever H pivotally supported at one end, pivoted to the free end of the lever G, and also extending under the said shaft; and a spring supported by the lever G and operating to press the free end of the lever H against the lever G, substantially as set forth.

P. A. SCHUMACHER.

Witnesses:
OLE HANSON,
ELIAS HANSON.